United States Patent
Lee et al.

(10) Patent No.: US 8,125,577 B2
(45) Date of Patent: Feb. 28, 2012

(54) INTEGRATED POWER CENTER AND MOUNT SYSTEM FOR FLAT SCREEN VIDEO DISPLAYS AND PROJECTORS WITH WIRELESS SIGNAL TRANSMISSION

(75) Inventors: Noel Lee, Las Vegas, NV (US); Anthony DiChiro, Chatsworth, CA (US); Demian Martin, San Leandro, CA (US)

(73) Assignee: Monster Cable Products, Inc., Brisbane, CA (US)

( * ) Notice: Subject to any disclaimer, the term of this patent is extended or adjusted under 35 U.S.C. 154(b) by 1137 days.

(21) Appl. No.: 11/849,830

(22) Filed: Sep. 4, 2007

(65) Prior Publication Data
US 2008/0143891 A1   Jun. 19, 2008

Related U.S. Application Data

(63) Continuation-in-part of application No. 11/325,617, filed on Jan. 3, 2006, now abandoned.

(51) Int. Cl.
*H04N 5/645* (2006.01)
(52) U.S. Cl. .................................... 348/836; 725/81
(58) Field of Classification Search .......... 348/836–842; 725/81
See application file for complete search history.

(56) References Cited

U.S. PATENT DOCUMENTS

| | | | | |
|---|---|---|---|---|
| 5,845,190 | A * | 12/1998 | Bushue et al. | 725/130 |
| 6,178,285 | B1 * | 1/2001 | Csipkes et al. | 385/147 |
| 6,742,185 | B1 * | 5/2004 | Andrews | 725/75 |
| 6,996,132 | B1 * | 2/2006 | Tolety | 370/517 |
| 7,493,645 | B1 * | 2/2009 | Tranchina | 725/75 |
| 7,679,888 | B2 * | 3/2010 | Kirschner et al. | 361/679.01 |
| 2004/0252562 | A1 * | 12/2004 | Kim | 365/200 |
| 2006/0135059 | A1 * | 6/2006 | Hill | 455/3.06 |
| 2007/0030405 | A1 * | 2/2007 | Childrey et al. | 348/794 |
| 2007/0089144 | A1 * | 4/2007 | Du Breuil et al. | 725/81 |
| 2007/0244822 | A1 * | 10/2007 | Hogan | 705/57 |
| 2008/0024662 | A1 * | 1/2008 | Chu | 348/553 |
| 2008/0051027 | A1 * | 2/2008 | Lee | 455/3.06 |
| 2008/0058011 | A1 * | 3/2008 | Lin et al. | 455/557 |
| 2008/0120683 | A1 * | 5/2008 | Frazier et al. | 725/141 |

* cited by examiner

*Primary Examiner* — Eileen D Lillis
*Assistant Examiner* — Alp Akbasli
(74) *Attorney, Agent, or Firm* — LaRiviere, Grubman & Payne, LLP

(57) ABSTRACT

A power center system for use with video display devices having a housing 2 for power conditioning circuitry for ameliorating electrical anomalies, housing 2 adapted for attachment to a flat surface 9, and mount 21 attached to housing 2 for supporting a video display device. The system includes a retransmitter for receiving video, audio and/or control signals from an external source and retransmitting them to the video device.

19 Claims, 3 Drawing Sheets

INTEGRATED POWER CENTER AND MOUNT SYSTEM FOR FLAT SCREEN VIDEO DISPLAYS AND PROJECTORS WITH WIRELESS SIGNAL TRANSMISSION

This application is a Continuation in Part (CIP) of patent application Ser. No. 11/325,617, filed on Jan. 3, 2006, and claims priority to that date.

TECHNICAL FIELD

The present invention generally relates to video flat screen displays. More particularly, the present invention relates to a mounting system for flat screen video displays integrated with a power center adapted for such displays and video signal management. Yet more particularly, the present invention relates to power centers and mounts for flat screen video displays further having wireless video signal links to the flat screen display.

BACKGROUND ART

Power centers for flat screen video displays such as plasma displays and liquid crystal displays (LCD), have been proposed. A power center for a plasma display is quite different from one for a projection display, for example. Further, in the prior art, a number of power centers have been devised which are designed to fit under a cathode ray tube (CRT) monitor. Such power centers do not however include mounting means. A problem with all of such power centers is the presence of unsightly wires connecting such displays and the undue multiplication of components.

A wide variety of mounts have also been proposed for use with flat screen video displays. A number of mounts have also been designed for use with video projectors for use with front projection flat screens. Prior art attempts to mount flat screen monitors have frequently been flimsy mounts which come with a monitor or more expensive brackets used to mount heavy plasma screen monitors, including television receivers, to a wall. A large number of very expensive projector mounts have also been devised but none of these projector mounts include power centers.

Thus, there is a long-standing need for a power center for a flat screen video display with includes a mount for the type of display for which it is suitable. Further, there is a need for a way to combine a power conditioning capability with the mount and simultaneously minimize or eliminate unsightly connecting wires and cables.

DISCLOSURE OF THE INVENTION

The present invention addresses the current needs for a system to power and mount a flat screen video display device, capable of freedom of movement in one, two, or three dimensions, and minimizing the need for cords or cables. The present invention combines a power conditioning device within a housing attachable to different surfaces, connected with a mount suitable for a variety of monitor and projector types, and having a wireless video signal receiving and transmitting capability. The power conditioning and mounting aspect of the presence invention is also addressed in patent application Ser. No. 11/325,617, of which this application is a CIP.

The wireless signal feature of the present invention combines a radio frequency (RF) video, audio and/or control signal from an external source outlet in a room with a transmitter for wireless connection with a video signal, IR signal and/or control signal receiver. The apparatus provides a wireless signal, such as but not limited to, CEC with HDMI, and a video receiver within the power center with multiple outputs such as, but not limited to, HDMI, component, S-video, Composite video, and analog audio. The video receiver then wirelessly transmits to a device for receiving the retransmitted video signal, audio signals, IR signal, and control signals, and connecting the signal with the video display device. The wireless transmitter within the power center can automatically detect live input with a priority table or can be controlled manually. The feature may include an antenna incorporated into the video display device, such as within a frame, an antenna within the power conditioning device or mount structure, or a separate antenna connected with the power conditioner/mount case.

BRIEF DESCRIPTION OF THE DRAWING

For a better understanding of the present invention, reference is made to the below referenced accompanying Drawing. Reference numbers refer to the same or equivalent parts of the present invention throughout the several figures of the Drawing.

MODES FOR CARRYING OUT THE INVENTION

Figure 1:
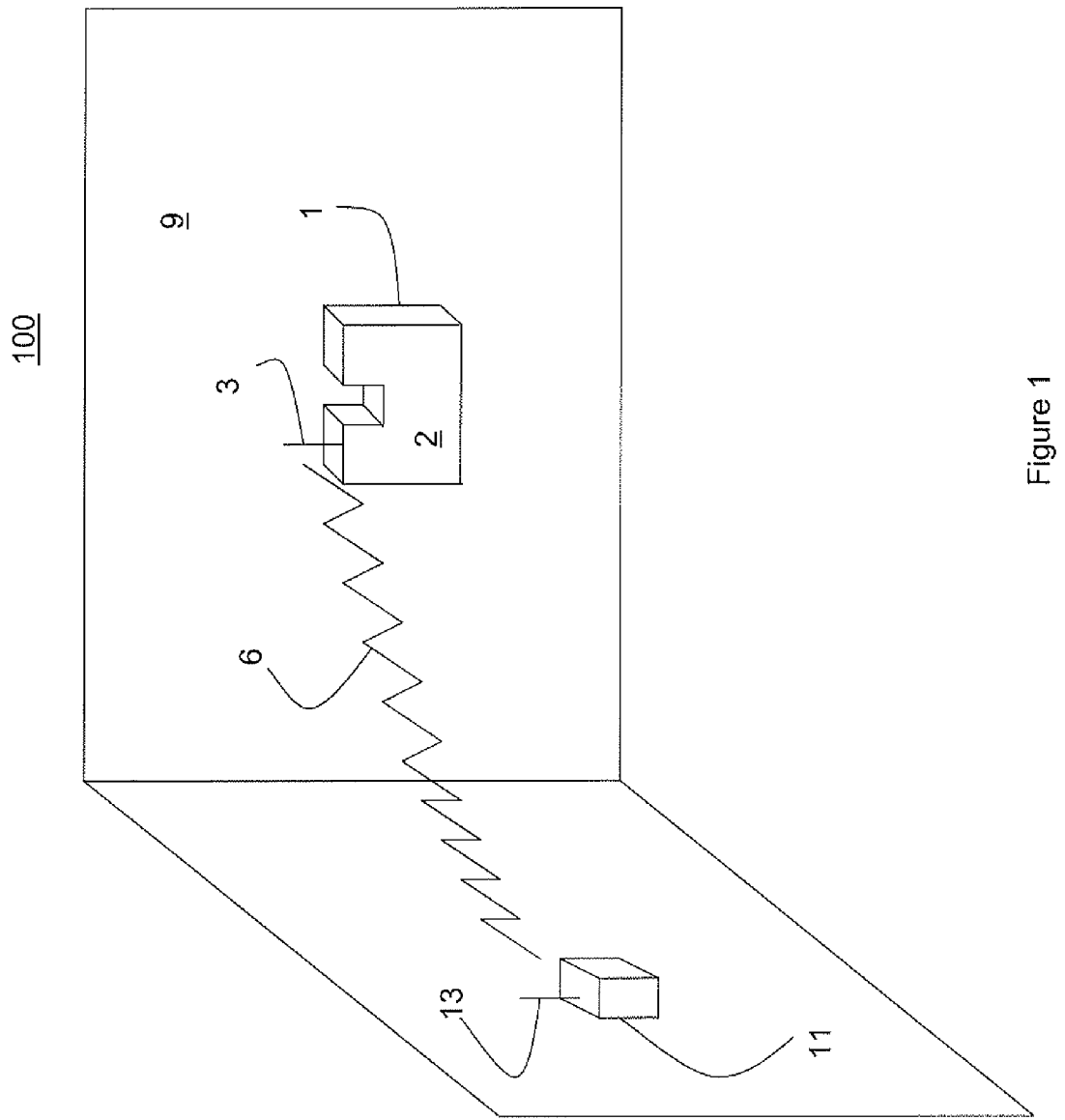
FIG. 1 is a conceptual perspective view of the invention.

Referring now to FIG. 1, a conceptual perspective view of the system 100 of the present invention is shown. For simplicity, system 100 is shown and described as functioning within a room, but it is understood that system 100 could function within more than one room. Apparatus housing 2 contains the power conditioning and other electronic components and supports the video display device (collectively referred to herein as conditioner/mount 1) as described in patent application Ser. No. 11/325,617, which is incorporated herein by reference. The power conditioner circuitry (e.g. MOVs, filters, etc.) provides conditioned power (i.e. power cleaned of spikes, noise, interference, phase shifts, etc.) to one or more outlets for connection with electronic components. The connected video display device mount (not shown) is capable of movement in three dimensions. Wall 9 defines one surface of the room and serves as a support for housing 2. Alternatively, housing 2 could be formed so as to be mounted within wall 9, with one surface flush with wall 9 outer surface. Conditioner/mount 1 is electronically connected with first antenna 3, for receiving video, audio, and control signals as disclosed herein. First antenna 3 may be any convenient form suitable for RF video, audio and control signals.

Electronic circuitry within housing 2 (herein second video signal electronic circuitry) encodes analog video, analog audio, digital audio, for transmission over video link 16. Similar circuitry in signal receiver 24 decodes the signals as appropriate for video display device 21. This circuitry includes a four input switch with auto detect and manual switching. Further, it may include infra red (IR) signal encoding and an IR emitter so that IR signals may be exchanged with a similarly equipped signal receiver 24. For HDMI communication, the circuitry employs standard CEC control protocol so that any device plugged into the system with an HDMI cable can be controlled by the apparatus by appropriately encoded signals over video link 16.

Video receiver/transmitter 11 (herein Rx/Tx 11, comprising a first video signal electronic circuitry) is connected with an external source 14 of video, audio and/or control signals such as a satellite system, cable system or a device for reproducing recorded video formats. For example, Rx/Tx 11 may be a High Definition Multimedia Interface (HDMI) wireless device such as a "T-Zero"® or the like. Rx/Tx 11 has second antenna 13 for transmitting video signals over wireless link 6 to first antenna 3 for processing by the video electronic circuitry components within housing 2.

Rx/Tx 11 is a ultra wide band (UWB) wireless transmitter/encoder/switcher/repeater. If external source 14 is providing an HDMI signal, Rx/Tx 11 inputs HDMI with audio to its transmitter. If Rx/Tx 11 detects a DVI input without audio it will combine the analog or digital audio and encode it to UWB. More typically, there are 2 HDMI inputs: 1 component video stream that is encoded to UWB and a composite and S-video stream that is also encoded to UWB. Additionally, there may be one analog audio input that is encoded to UWB, and/or a digital audio stream that is also encoded to UWB. Rx/Tx 11 auto detects these inputs and selects which one is active or live and uses that as the stream to UWB which is then sent wirelessly to the receiver in housing 2. These various input signals can be switched manually as well. Rx/Tx 11 can also take in an IR signal for repeating, and may include an AV receiver, smart control, etc. for encoding to UWB. Further, Rx/Tx 11 can encode the CEC control (a control standard for CE devices) signal from any device that has an HDMI and is compliant with the HDMI specification and encode it to UWB. Rx/Tx 11 may further have a DVD HD player with HMDI out, a media center with HDMI out, set top box with component video and digital audio out, VCR with s-video and analog audio out and may transmit any signal to the exemplary flat panel TV and play video, audio. As such, Rx/Tx 11 may be controlled with JR or CEC or a switch input.

Figure 2:
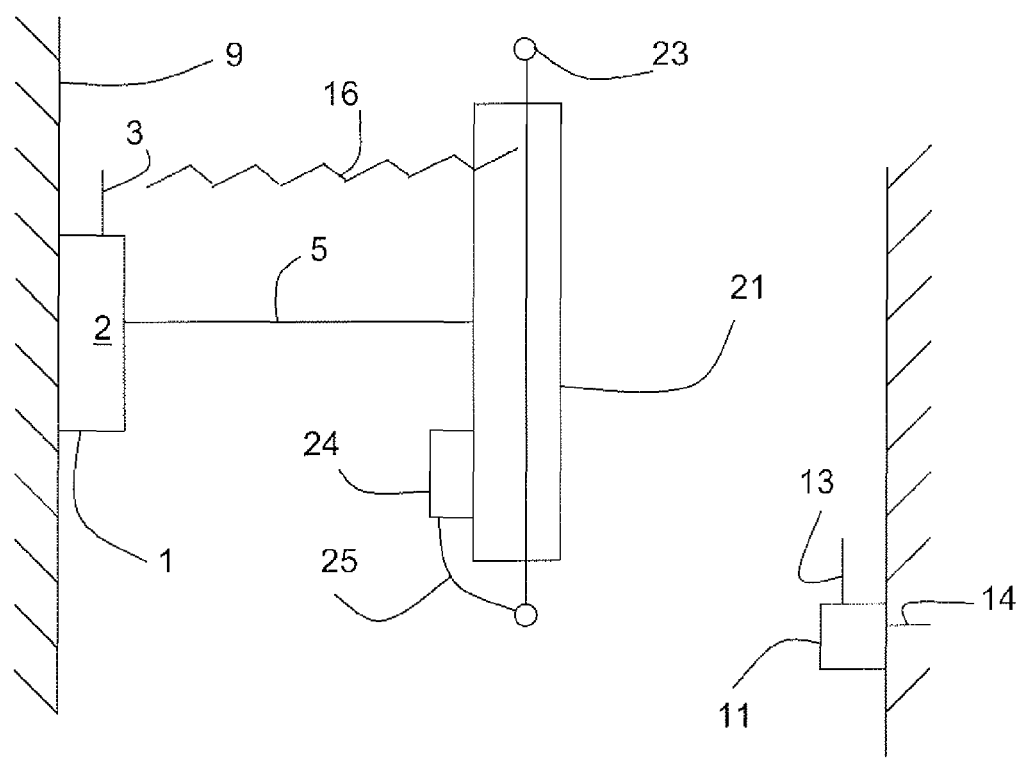
FIG. 2 is an expanded scale side view of the invention of FIG. 1.
Figure 3:
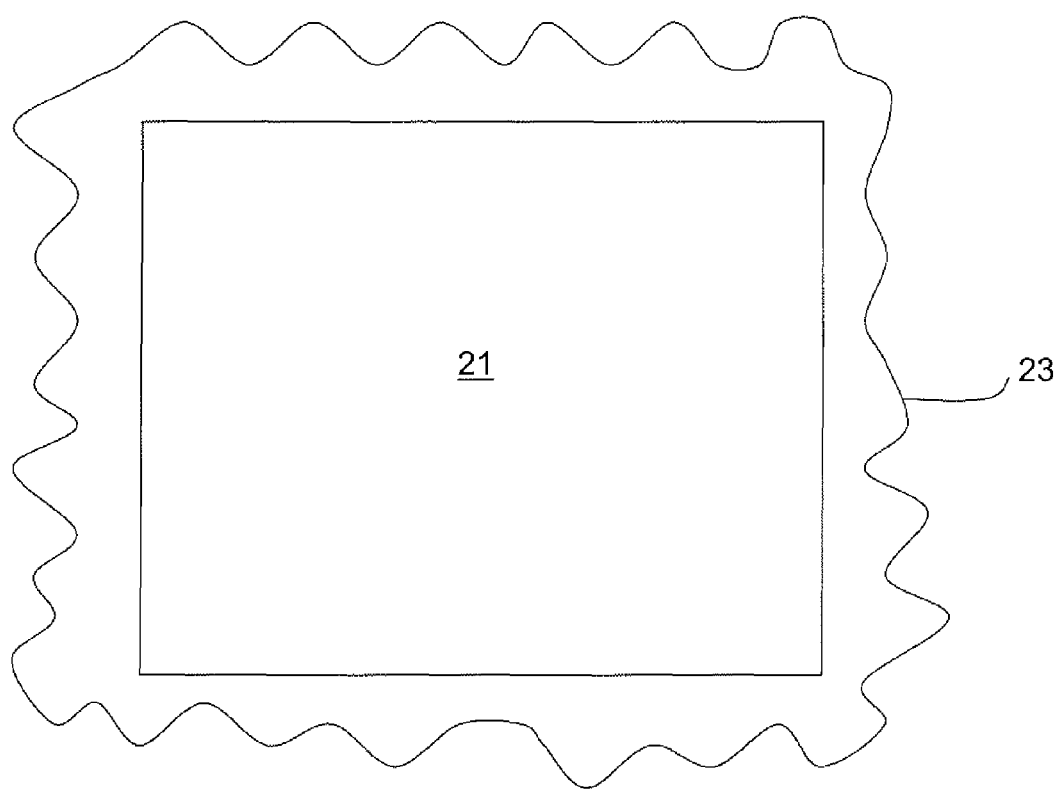
FIG. 3 is a frontal view of an exemplary video device.

Referring now to FIG. 2, an expanded side view of an exemplary embodiment of the invention is shown. First antenna 3 wirelessly receives the UWB video signal transmitted by Rx/Tx 11 from second antenna 13. Second video signal electronic circuitry (not shown) in housing 2 is also a UWB receiver/decoder/IR repeater/CEC controller. This circuitry takes the UWB signal from Rx/Tx 11 and decodes the UWB signal to video, analog, audio, CEC control, IR input/output, 2 way communication and the like. The circuitry outputs HDMI with digital audio included, right/left analog audio. Housing 2 may further have a connector for an IR remote receiver or an IR emitter, electrically connected with the second video signal electronic circuitry. Second video signal electronic circuitry processes the video, audio and/or control signal as necessary for relay to video display device 2. The video, audio and/or control signal is transferred from conditioner/mount 1 to video display device 21 over video link 16. Video link 16 may be either wireless or hard wired. If video link 16 is wireless, the video signal is passed from first antenna 3 to third antenna 23 and over connection 25 to signal receiver 24 for use by video display device 21. If video link 16 is hardwired, the video, audio and/or control signal is passed directly from conditioner/mount 1 to video display device 21, and may or may not pass through signal receiver 24. Third antenna 23 may be a conductor incorporated into a frame around video display device 21 as shown, a stub antenna, a conductor incorporated into a clear tape for adhesion to the case of video display device 21, or any other convenient antenna form suitable for video, audio and/or control signals.

In an alternative configuration, the video, audio and/or control signal processing components of conditioner/mount 1 may be housed in video receiver 24 separately from the power conditioning components, and would then receive the video signal from third antenna which received the video signal directly from Rx/Tx 11 antenna 13. In either configuration, video display device 21 would continue to receive conditioned power from conditioner/mount 1 over power link 5.

The present invention satisfies the needs discussed above. The present invention combines a power conditioning center device with a physical support or mount suitable for a variety of monitor and projector types, and includes a wireless video signal receiving device. Upon reading the above description of the invention, various alternative embodiments will become obvious to those skilled in the art. These embodiments are to be considered within the scope and spirit of the subject invention, which is only to be limited by the claims and their equivalents.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more."

All structural and functional equivalents to the elements of the above-described preferred embodiment and additional embodiments that are known to those of ordinary skill in the art are hereby expressly incorporated by reference and are intended to be encompassed by the present claims. However, it should be readily apparent to those of ordinary skill in the art that various changes and modifications in form, apparatus material, and fabrication material detail may be made without departing from the spirit and scope of the invention as set forth in the appended claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. No claim herein is to be construed under the provisions of 35 U.S.C. 112, sixth paragraph, unless the element is expressly recited using the phrase "means for."

INDUSTRIAL APPLICABILITY

The present invention applies industrially to a mounting system for flat screen video displays integrated with a power center adapted for such displays and video, audio and/or control signal management. The present invention further includes wireless video, audio and/or control signal links to the flat screen display. The invention may be made by a skilled practitioner using readily available components.

What is claimed:

1. An apparatus for use with video display devices comprising:
   a. a housing for electronic circuitry adapted for attachment to a flat surface;
   b. a mount, attached to the housing, that physically supports a video display device;
   c. first video signal electronic circuitry in the housing for receiving a video signal from an external source and wirelessly retransmitting it to a second video signal receiving electronic circuitry; and d. second video signal electronic circuitry in the housing for wirelessly receiving the video signal and retransmitting it to the video display device.

2. The apparatus as in claim 1 wherein the housing is further adapted to mount within a wall.

3. The apparatus as in claim 2 wherein the mount is adapted to move in three dimensions.

4. The apparatus as in claim 1 wherein the first video signal electronic circuitry retransmits the video signal to the video display device over a wireless link.

5. The apparatus as in claim 1 wherein the second video signal electronic circuitry is connected with the video display device.

6. A power center for use with video display devices comprising:
   a. a housing for electronic circuitry adapted for attachment to a flat surface;
   b. power conditioning electronic circuitry in the housing for conditioning electrical power received through a means for connection to a source of AC electric current;
   c. at least one power outlet receiving conditioned power from the power conditioning electronic circuitry;
   d. a mount, attached to the housing, that physically supports a video display device;
   e. first video signal electronic circuitry for receiving a video signal from an external source and wirelessly retransmitting it to a second video signal receiving electronic circuitry; and
   f. second video signal electronic circuitry for wirelessly receiving the video signal and retransmitting it to the video display device.

7. The power center as in claim 6 wherein the second video signal electronic circuitry encodes analog video, analog audio, digital audio, and control signals for transmission to the video display device.

8. The power center as in claim 7 further having electronic circuitry at the video display device for decoding the analog video, analog audio, digital audio, and control signals as appropriate for the video display device.

9. The power center as in claim 7 further having infra red (IR) signal encoding and an IR emitter for exchanging IR signals with a similarly equipped IR signal receiver at the video display device.

10. The power center as in claim 6 wherein the second video signal electronic circuitry is contained within the housing.

11. The power center as in claim 10 wherein the second video signal electronic circuitry retransmits the video signal to the video display device over a wireless link.

12. The power center as in claim 10 wherein the second video signal electronic circuitry retransmits the video signal to the video display device over a hardwire link.

13. The power center as in claim 6 wherein the second video signal electronic circuitry is physically connected with the video display device.

14. The power center as in claim 6 wherein the housing is further adapted to be installed within a wall.

15. The power center as in claim 14 wherein the mount is adapted to move in three dimensions.

16. The power center as in claim 6 wherein the first video signal electronic circuitry encodes analog video, analog audio, digital audio, and control signals for transmission to the second video signal electronic circuitry.

17. The power center as in claim 16 wherein the second video signal electronic circuitry encodes analog video, analog audio, digital audio, and control signals for transmission to the video display device.

18. The power center as in claim 17 further having electronic circuitry at the video display device for decoding the analog video, analog audio, digital audio, and control signals as appropriate for the video display device.

19. The power center as in claim 6 further having infra red (IR) signal encoding electronic circuitry and an IR emitter for exchanging IR signals with a similarly equipped IR signal receiver at the video display device.

* * * * *